US010099788B2

(12) United States Patent
Lins

(10) Patent No.: US 10,099,788 B2
(45) Date of Patent: Oct. 16, 2018

(54) LIGHTING ARRANGEMENT FOR AN INTERIOR OF A VEHICLE

(71) Applicant: DIEHL AEROSPACE GMBH, Ueberlingen (DE)

(72) Inventor: Bastian Lins, Erlangen (DE)

(73) Assignee: DIEHL AEROSPACE GMBH, Ueberlingen (DE)

(*) Notice: Subject to any disclaimer, the term of this patent is extended or adjusted under 35 U.S.C. 154(b) by 0 days.

(21) Appl. No.: 15/611,102

(22) Filed: Jun. 1, 2017

(65) Prior Publication Data

US 2017/0349285 A1 Dec. 7, 2017

(30) Foreign Application Priority Data

Jun. 1, 2016 (DE) .................. 10 2016 006 703

(51) Int. Cl.
| | | |
|---|---|---|
| *B64D 11/00* | (2006.01) | |
| *B60Q 3/40* | (2017.01) | |
| *F21W 105/00* | (2018.01) | |
| *B60Q 3/43* | (2017.01) | |
| *F21W 107/30* | (2018.01) | |

(52) U.S. Cl.
CPC .............. *B64D 11/00* (2013.01); *B60Q 3/40* (2017.02); *B60Q 3/43* (2017.02); *B64D 2011/0038* (2013.01); *B64D 2203/00* (2013.01); *F21W 2105/00* (2018.01); *F21W 2107/30* (2018.01)

(58) Field of Classification Search
CPC .... B64D 2011/0046; B64D 2011/0053; B64D 2011/0038; B64D 2203/00; F21W 2107/00–2107/30; F21W 2106/00; H04N 9/31–9/3197; B60Q 3/40–3/43
See application file for complete search history.

(56) References Cited

U.S. PATENT DOCUMENTS

| | | | | |
|---|---|---|---|---|
| 6,558,028 B1 * | 5/2003 | Watkins | ................... | B60Q 3/74 359/13 |
| 2008/0158900 A1 * | 7/2008 | Showalter | ................ | B60Q 3/74 362/490 |

(Continued)

FOREIGN PATENT DOCUMENTS

| | | |
|---|---|---|
| DE | 102007023344 A1 | 12/2008 |
| DE | 102008019926 A1 | 2/2010 |
| DE | 102009008084 A1 | 9/2010 |

*Primary Examiner* — Mariceli Santiago
(74) *Attorney, Agent, or Firm* — Scully Scott Murphy and Presser; Frank DiGiglio

(57) ABSTRACT

In a lighting arrangement (2) for an interior (4) of a vehicle, having a beam area (6) for emitting light (8) into an environment (10) of the lighting arrangement (2), having at least one first luminaire (12a, b) having a first luminous area (14a, b) for emitting the light (8), the first luminous area (14a, b) being part of the beam area (6), having at least one projector (16) with a beam opening (18) for emitting the light (8), the beam opening (18) being part of the beam area (6), at least one of the first luminaires (12a, b) has at least one passage region (34) for at least one part of one of the beam openings (18) of one of the projectors (16) on its first luminous area (14a, b), and/or, in at least one of the projectors (16), a surface region (20) of the projector (16) which is adjacent to the beam opening (18) is in the form of a second luminaire (21) having a second luminous area (22) for emitting light (8), the second luminous area (22) being part of the beam area (6).

15 Claims, 3 Drawing Sheets

(56) References Cited

U.S. PATENT DOCUMENTS

| | | | |
|---|---|---|---|
| 2009/0262545 A1 | 10/2009 | Amelung et al. | |
| 2010/0201951 A1* | 8/2010 | Budinger | B60Q 3/43 |
| | | | 353/13 |
| 2011/0095911 A1 | 4/2011 | Babst et al. | |
| 2012/0292986 A1* | 11/2012 | Riedel | B64D 11/00 |
| | | | 307/9.1 |
| 2014/0002279 A1 | 1/2014 | Rittner et al. | |
| 2014/0340916 A1* | 11/2014 | Riitner | B60Q 3/82 |
| | | | 362/470 |
| 2017/0073074 A1* | 3/2017 | Gagnon | B64D 11/00 |

* cited by examiner

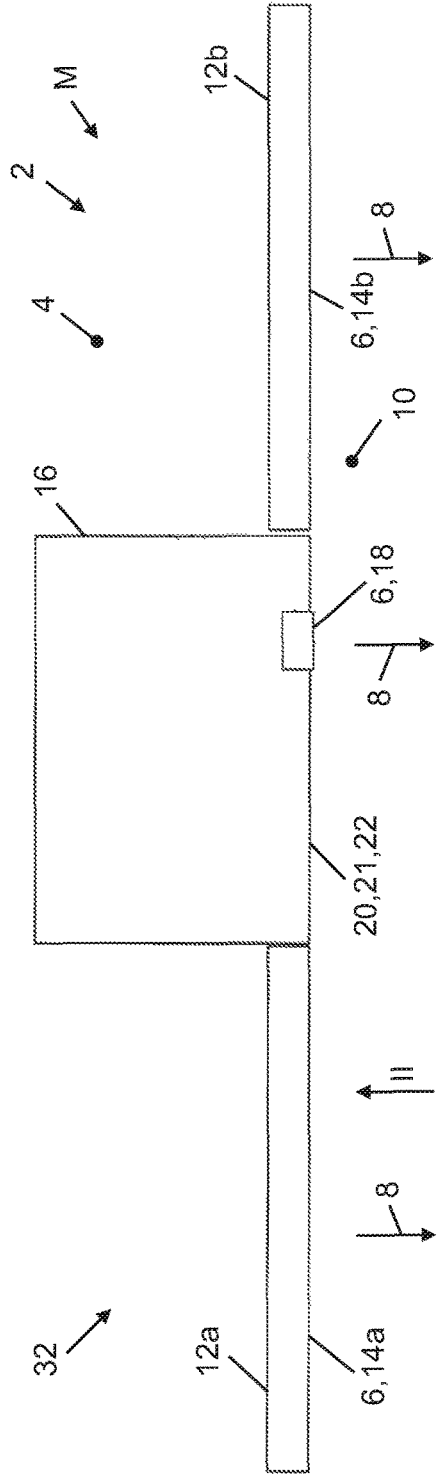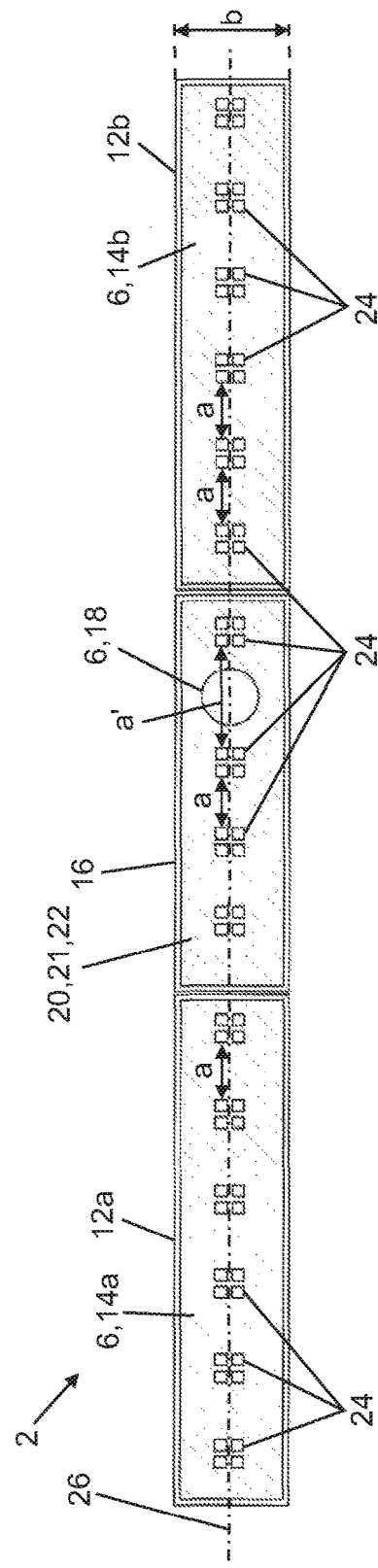

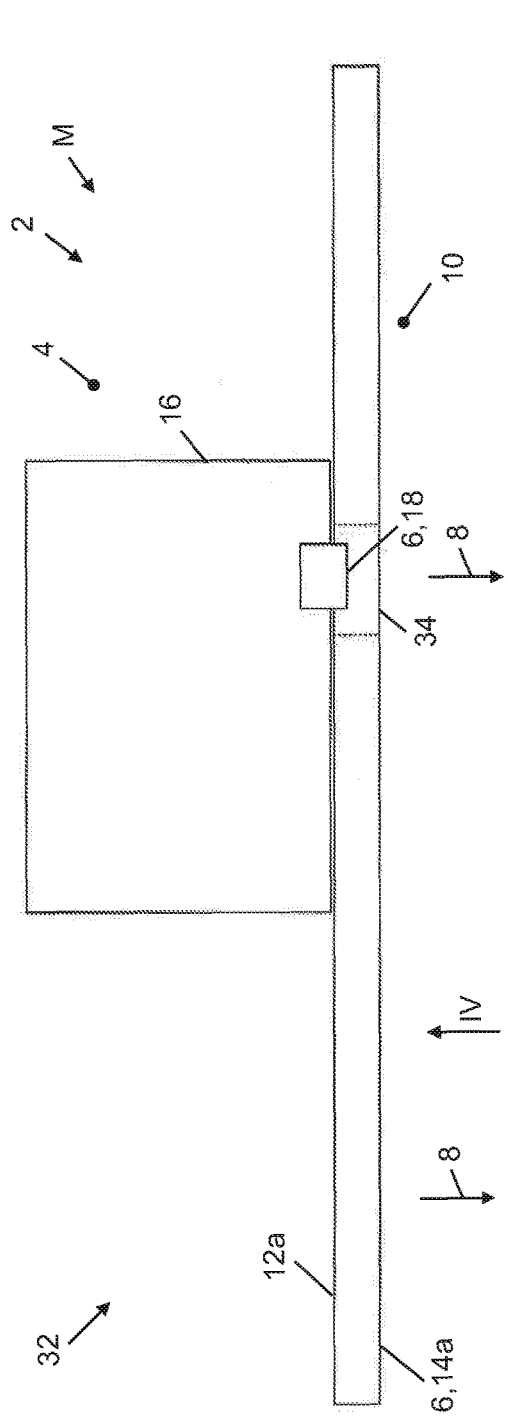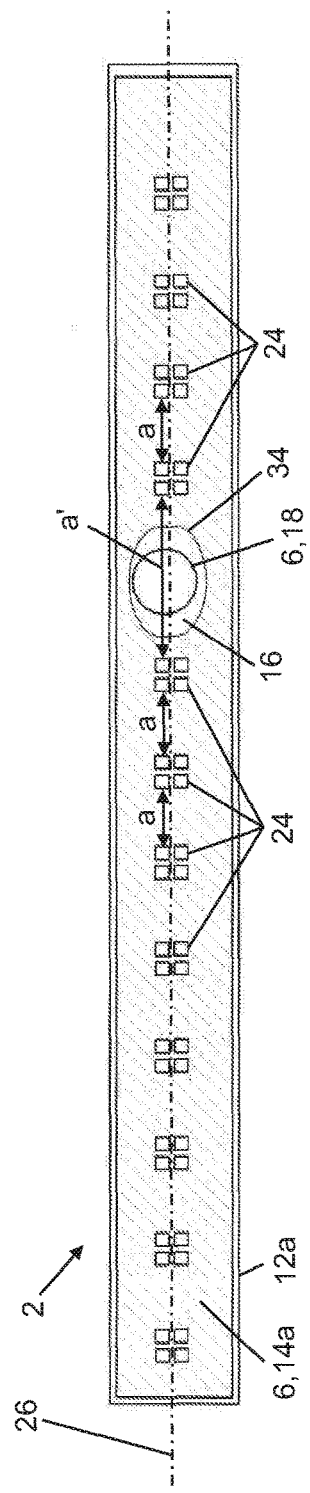

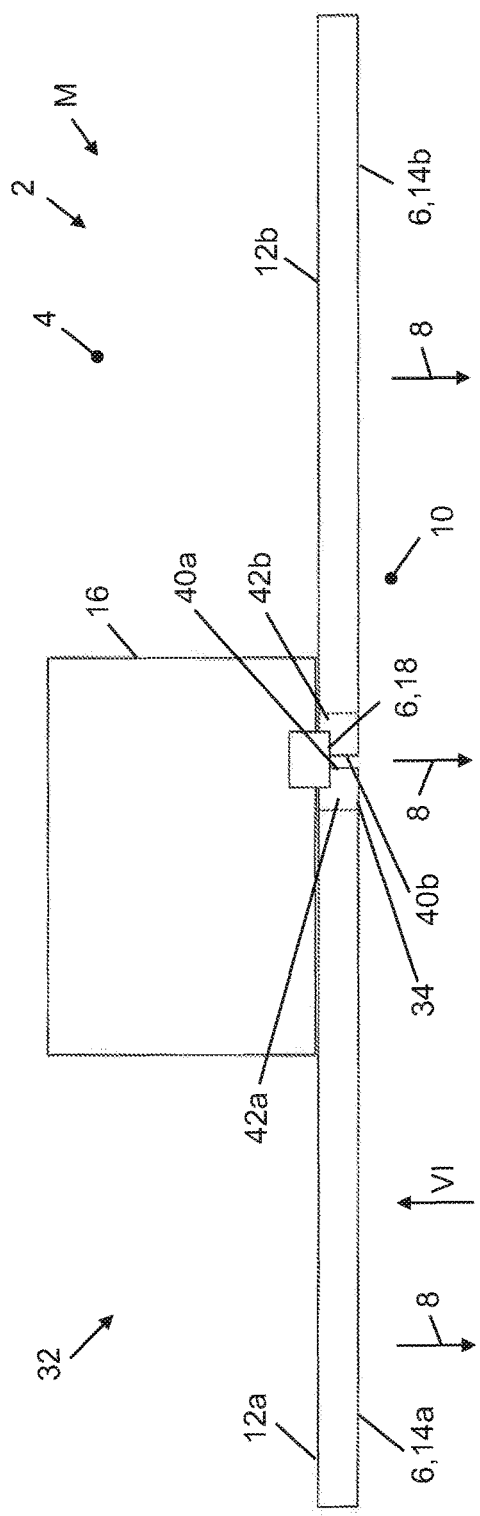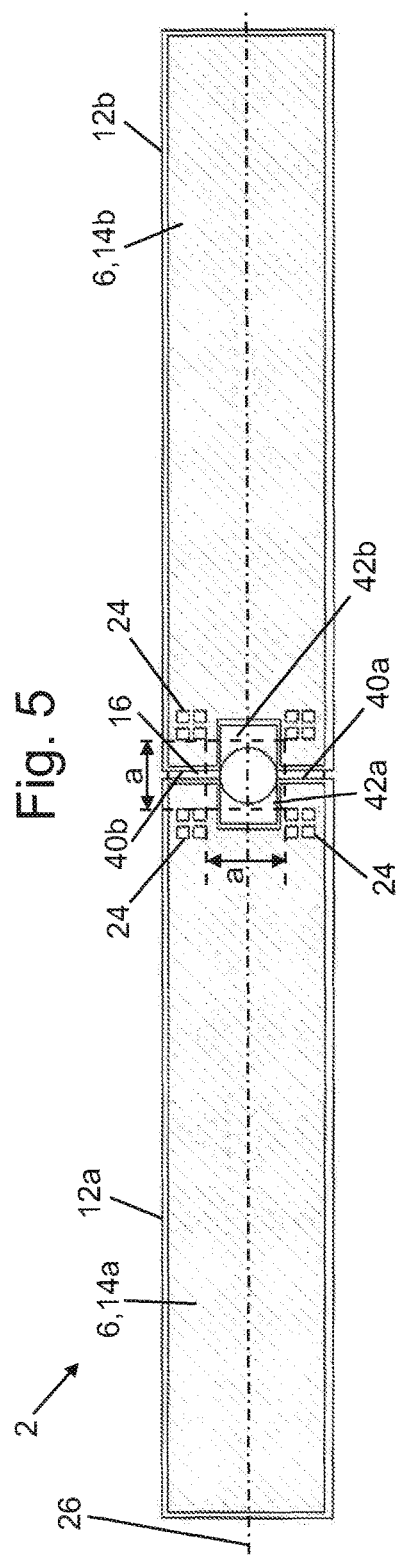

LIGHTING ARRANGEMENT FOR AN INTERIOR OF A VEHICLE

BACKGROUND OF THE INVENTION

The invention relates to a lighting arrangement for an interior of a vehicle.

DISCUSSION OF THE PRIOR ART

DE 10 2007 023 344 A1 discloses a ceiling projection device for projecting image contents onto an interior wall in a large cabin of a means of transport. The ceiling projection device has a projector for producing optical image contents and for projecting the image contents onto an interior wall of the means of transport. The interior wall may be a ceiling panel, a side wall or the floor of the cabin. The large cabin of the means of transport may be a passenger cabin in an aircraft. The projector is integrated in a luggage compartment of the means of transport.

The present invention is directed to improving the accommodation of a projector in an interior of a vehicle.

SUMMARY OF THE INVENTION

The lighting arrangement in accordance with the present invention is a lighting arrangement for an interior of a vehicle. The lighting arrangement contains a beam area. Light is emitted into an environment of the lighting arrangement from the beam area during operation of the lighting arrangement. The lighting arrangement contains at least one first luminaire. The first luminaire contains a first luminous area for emitting the light. The first luminous area is part of the beam area. The lighting arrangement contains at least one projector. The projector has a beam opening for emitting the light. The beam opening is likewise part of the beam area.

The present invention also comprises the fact that the lighting arrangement has one or both of the following features 1.) and/or 2.):
1.) At least one of the first luminaires has at least one passage region on its first luminous area. The passage region is used for at least one part of one of the beam openings of one of the projectors. In the passage region, light from the projector which is emitted or is to be emitted during operation passes through the first luminous area.
2.) Alternatively or additionally, in at least one of the projectors, a surface region of the projector which is adjacent to the beam opening is in the form of a second luminaire having a second luminous area for emitting the light. The second luminous area is part of the beam area.

A second luminous area on a projector therefore likewise forms a luminaire (second luminaire) for emitting light. In other words, a part of the projector is likewise in the form of a luminaire in this case which is not used to emit the projection light.

The passage region is, in particular, a recess in the first luminous area. The beam opening itself can project through the passage region (may be behind or beam-downstream of said region, as seen in the beam direction) or may lie in said region. Alternatively, the beam opening is set back (beam-upstream) in front of the passage region, as seen in the beam direction, with the result that the light which has emerged from the beam opening passes through the passage region during operation.

The beam area is at least partially an area which is actually present, for example a cover plate of a luminaire or a lens of a projector, and/or at least partially an imaginary area through which the light generated by the luminaire or the projector passes. The beam opening is a concrete part of the projector.

According to the invention, the result is therefore an integrated beam area which contains both regions for the exit of light from the luminaires and regions for the exit of light from the projectors. According to the invention, luminaires and projectors are seamlessly integrated in a single lighting arrangement.

In one preferred embodiment, the lighting device has an at least semi-transparent cover, that is to say a semi-transparent or transparent cover, possibly also in certain regions. The cover is situated in the region of the beam area and is connected downstream of the beam area, in particular as seen in the beam direction of the light. It is, in particular, a continuous area without cracks, in particular a flat area. For example, it is a concrete light screen which is arranged downstream of the luminaires and projectors, as seen in the beam direction, and through which the respectively generated light emerges into the environment. The cover then forms a common outer surface of the lighting arrangement with respect to the environment and is a concrete component.

The cover is transparent to light from the beam opening in the passage region. The cover is transparent wherever light from the projector therefore penetrates the cover. The projected light can therefore pass unhindered through the transparent part of the cover, the cover being transparent or semi-transparent in the remaining regions of the cover. For the situation in which, and in the regions in which, the beam area is an imaginary area, it can also coincide with the cover.

In one preferred variant of this embodiment, the cover is in the form of an optically effective and/or optically adjustable element at least in the passage region. The cover then optically acts on the light which passes through the cover at this location and therefore provides sufficient possibilities for manipulating the light. The element is then a lens or a mirror or an optical switch, for example.

In one preferred embodiment, one or more first luminous areas and/or—if present—one or more second luminous areas correspond to one another with respect to their optical appearance. In this case, the optical appearance may relate to the dimensions and/or the appearance and/or the light emission characteristic and/or the design of the luminous areas. As a result, the first and/or second luminaires have the same optical appearance for an observer, which results in a harmonic overall impression of the overall lighting arrangement with respect to its luminaires.

In one preferred variant of this embodiment, the luminous areas correspond to one another with respect to the arrangement of light sources. The light sources are those light sources of the first luminaires and/or, if present, second luminaires which emit the respective light of the relevant luminaire. Therefore, the luminaires have a mutually corresponding arrangement of light sources on the luminous areas with respect to light emission, which results in a particularly harmonic overall impression of the lighting arrangement.

In one preferred variant of this embodiment, the arrangement is the mutual distance and/or the geometry of two light sources. The light sources of the luminaires are therefore designed at mutually corresponding distances and/or in mutually corresponding geometries, which likewise results in a particularly harmonic overall impression of the lighting arrangement.

In one preferred variant of this embodiment, all distances between adjacent light sources are equal. One exception is formed only by those distances between light sources which are on both sides of a beam opening. In particular, the light sources on both sides of a beam opening are then at a different distance from one another which is greater than, less than, a multiple of or a fraction of the otherwise equal distance between light sources. For example, the distance between adjacent light sources in the region of a beam opening is twice as large as the distance between two other light sources between which a beam opening is not provided. This also results in a particularly harmonic overall impression of the lighting arrangement and also in uniform emission of light from the light sources.

In one preferred embodiment, the beam area is formed entirely from luminous areas (first and, if present, second) and beam openings. "Entirely" means that—comparatively small (in particular in relation to the beam area)—gaps are tolerated between individual objects such as luminaires or projectors. The result is therefore particularly homogeneous lighting, in particular if the beam area extends over the entire area of the lighting arrangement facing the environment.

In one preferred embodiment, the beam area is in the form of a strip and extends along a progression line. In other words, the beam area forms a light strip of first luminaires and beam openings and, if present, second luminaires on projectors, that is to say with integrated projectors. The result is therefore an alternate arrangement of the emission of light from luminaires or luminous areas and light from projectors along the strip-shaped course. In particular, all light sources are linearly lined up on the progression line or on parallel lines parallel to the progression line.

In one preferred variant of this embodiment, the beam openings are arranged along the progression line. At least one of the (first and/or, if present, second) luminaires or luminous areas is arranged on both sides of each of the beam openings. The exception is edge beam openings at or with which the lighting arrangement ends. In this case, a luminaire or luminous area can be compulsorily situated only on one side of the beam opening. The result is therefore homogeneous and optically attractive integration of luminaires and beam openings for projection light. This form of the arrangement does not exclude the fact that beam openings can additionally also be arranged beside one another, that is to say in directions transverse to the progression line, and luminous areas can be arranged beside one another or in succession. Since the luminaires contain light sources, in particular, beam openings are therefore arranged (if not at the edges) in gaps between two light sources.

In one preferred embodiment, the lighting arrangement has at least two adjacent luminaires. Their first luminous areas have respective sections on their edge sides facing one another. The sections complement one another to form an overall passage region. The sections are therefore parts of a common passage region. The sections of two luminaires therefore complement one another, in particular to form an overall passage region, in particular in the form of a recess, a gap being able to be present or not being able to be present between the luminaires or between the respective luminous areas of the luminaires.

In one preferred embodiment of the alternative with a surface region, the surface region is an end side of the projector facing the environment in the intended mounting state. According to this embodiment, the projector therefore has a second luminaire or luminous area or light sources on the corresponding end side in order to therefore likewise constitute or have a luminaire in its region of the end face which is not used for projection.

In one preferred embodiment, the (first and/or, if present, second) luminaire is an LED luminaire (light-emitting diode). The light sources of a corresponding luminaire are therefore LEDs. LED luminaires can be implemented, in particular, as second luminaires with particularly little installation space on a projector surface or end face.

In one preferred embodiment, the lighting arrangement is a lighting arrangement for a passenger cabin as an interior. The passenger cabin is that of an aircraft as a vehicle.

In one preferred embodiment, the lighting arrangement is in the form of an integrated structural unit which can be installed—as a complete device—in the interior. The lighting arrangement can therefore be installed as a complete device as a whole comprising projectors and luminaires in a fixed relative arrangement with respect to one another, which considerably reduces the effort needed to install luminaires and projectors in the interior.

The invention is based on the following knowledge and considerations, in which case embodiments of the invention, also in the combination of the above-mentioned embodiments, possibly also embodiments which have not been previously mentioned, are summarized as follows:

The projection of image contents or videos onto surfaces in a vehicle cabin, in particular an aircraft cabin, is a technology in development. For the purpose of projection, projection modules must be integrated in the aircraft cabin. Since the integration space available for lighting systems is very limited in the cabin, luminaires, in particular LED cabin luminaires, and the projection modules compete for the same installation spaces. For example, a light strip which is uninterrupted per se and consists of a plurality of luminaires must be interrupted over the length corresponding to the length of the projection module. In other words, an entire projection module is then arranged between two luminaires. Therefore, no lighting in the conventional sense of a luminaire can take place over the length of the projection module and projection light emerges only at a comparatively small location of the projector.

The invention is based on the consideration of providing a possible way of integrating the projector modules such that the integration of the cabin lighting is disrupted as little as possible.

Full-colour LED lighting systems for or in the form of luminaires are available on the market. According to the invention, the devices ((full-colour) (LED) luminaires, projectors) which are based on both technologies ((full-colour) (LED) lighting, projection) are integrated in the special manner associated with a small space requirement and with little adverse effect on the aesthetic impression of the lighting/projection. According to the invention, an (LED) luminaire, a projection module or both is/are configured in a suitable manner, such that virtually seamless integration of both technologies is possible. This is effected, for example, by placing luminaires or light sources, in particular LEDs, in that region of the outside of the projector module facing the cabin (environment) in which the light exit opening (beam opening) of the projection (objective) is not situated or by configuring the LED luminaire with a recess/opening or the like through which the light from the projection module to then be integrated behind it can emerge.

According to the invention, the result is a space saving during integration and the conservation of an aesthetically attractive lighting situation with simultaneous use of projection technology. According to the invention, both technologies or the associated devices are combined in the special manner associated with a small space requirement and with little adverse effect on the aesthetic impression of lighting/projection.

The luminaire, the projection module or both are designed such that there is a favourable integration situation for the entire installation.

According to the invention, a complete structure is respectively produced from a combination of luminous elements (first luminaire) and projector elements (projector, possibly with a second luminaire). This complete structure can actually consist of at least two independent devices which are then integrated in a suitable relative position in the interior (in the cabin), or the complete structure of the elements is combined in a complete device (structural unit) which can then be installed in the cabin.

Both types of device (luminaires, projectors) are together controlled by a superordinate system (not described in any more detail here).

According to the invention, the result is therefore (LED) luminaire/projector integration. An (LED) luminaire and/or a projection module for image contents is/are configured by means of suitable shaping and (LED) placement in such a manner that integration of the projection module in a light arrangement consisting of (LED) luminaires (in particular a light strip) in as seamless a manner as possible becomes possible.

In one embodiment, "conventional" luminaires (first luminaires), that is to say luminaires which are not designed in a special manner, are combined or used with an adapted projector module. A second luminaire (in particular LEDs) which, in a similar manner to the conventional (first) luminaire, contributes to the cabin lighting is arranged on that side of the housing of the projection module which faces the cabin in the region which is not occupied by the objective or the exit of light from the projection (beam opening).

In one embodiment, adapted (first) luminaires with a passage region (in particular aperture) in the inner region of the luminaire are used. Over the length of the luminaire, a passage region (aperture) is created at the required location, through which passage region the light (from the beam opening) from the projection module placed behind it, as seen from the cabin, can pass. The passage region (aperture) may be a true mechanical recess (hole in the luminaire) or an optically transparent region which may, however, be surrounded by the transparent cover of the luminaire, for example. In the latter case, this optically transparent region may also be in the form of an optically effective element, for example in the form of a lens or mirror which adapts the image from the projector with respect to angular distribution etc., or else in the form of an optical switch which hides the projector by changing over from transparent to opaque. The passage region (aperture) may have a round, rectangular or any desired other contour.

In one embodiment, adapted (first) luminaires with an adapted contour in the edge regions are used. The luminaire is configured in such a manner that a half-opening for the passage of light from the projector is provided at the ends of the luminaire. Putting two luminaires of this type together produces a complete opening for the passage of light from the projector at the joint of the two half-openings.

BRIEF DESCRIPTION OF THE DRAWINGS

Further features, effects and advantages of the invention emerge from the following description of a preferred exemplary embodiment of the invention and the accompanying figures. In this case, in a basic schematic diagram:

FIG. 1 shows a plan view of a lighting arrangement having a second luminaire,

FIG. 2 shows a front view of the lighting arrangement from FIG. 1,

FIG. 3 shows a plan view of a lighting arrangement with a passage region,

FIG. 4 shows a front view of the lighting arrangement from FIG. 3,

FIG. 5 shows a plan view of a lighting arrangement with sections of a passage region, FIG. 6 shows a front view of the lighting arrangement from FIG. 5.

DETAILED DESCRIPTION OF THE INVENTION

FIG. 1 shows a plan view or a top view of a lighting arrangement 2 for an interior 4 (only sections of which are illustrated here) of a vehicle (not illustrated in any more detail). The interior 4 is a passenger cabin and the vehicle is an aircraft. The lighting arrangement 2 is therefore a lighting arrangement 2 for a passenger cabin of an aircraft. The lighting arrangement 2 has a beam area 6 from which light 8 is emitted into an environment 10 of the lighting arrangement 2 during operation of the lighting arrangement 2. The direction of emission of the light 8 is symbolized by arrows.

The lighting arrangement 2 has two first luminaires 12a, b. The first luminaire 12a has a first luminous area 14a, and the first luminaire 12b has a first luminous area 14b. The luminous areas 14a, b are here concrete boundary areas of the first luminaires 12a, b and are used to emit the light 8. The first luminous areas 14a, b are each part of the beam area 6. The luminaires 12a, b are LED luminaires.

The lighting arrangement 2 also contains a projector 16 having a beam opening 18 for emitting light 8. The beam opening 18 is here an objective of the projector 16 and is likewise part of the beam area 6. The projector 16 has a surface region 20 which is adjacent to the beam opening 18. The surface region 20 of the projector 16 is an end side 30 of the projector 16. In the intended mounting state M illustrated, the lighting arrangement is mounted and oriented as intended in the interior 4. The end side 30 faces the environment 10. The surface region 20 has or is in the form of a second luminaire 21 with a second luminous area 22 for emitting light 8. The second luminous area 22 is likewise part of the beam area 6. The luminaire 21 is an LED luminaire.

FIG. 2 shows the lighting arrangement from FIG. 1 in the direction of the arrow II, that is to say in a front view. The first luminaires 14a, b and the second luminaire 21 contain light sources 22 for actually generating the light 8. Each of the light sources 24 is a four-colour LED with four individual LEDs, which is not explained in any more detail here. The placement of the light sources 24 illustrated can be understood merely as an example. The entire region of the luminaires 12a, b and 21 which is illustrated in FIGS. 2, 4, 6 can be used for the arbitrary placement of light sources 24. This also applies to all exemplary embodiments.

The first luminous areas 14a, b and the second luminous area 22 correspond to one another with respect to their optical appearance. The correspondence of the appearance relates to the design, to the appearance and to the dimensions of the luminous areas 14a, b, 22. Therefore, they all have the same width b and equal distances a between adjacent light sources 24 in each case. The arrangements of the light sources 24 generating the respective light 8 therefore also correspond to one another with respect to the first luminous areas 14*a*, *b* and the second luminous area 22. In this case, the arrangement is the mutual distance a between two light sources 24 and the geometry of the light sources 24 themselves. In this case, the geometry can be understood as meaning the illustrated or indicated square arrangement of the light sources 24 with respect to their respective four individual LEDs and the dimensions of the individual light sources 24.

In the example, all distances a between two adjacent light sources 24 are equal, with the exception of the distance between those two light sources 24 which are on both sides of the beam opening 18. These light sources 24 are at a distance a' from one another, which, however, corresponds here to twice the distance a (a'=2 a).

In the example, the beam area 6 is entirely formed from the first and second luminous areas 14*a*, *b* and 22 and the beam opening 18. "Entirely" is understood here as including respective or any gaps between the first and second luminous areas 14*a*, *b* and 22 and the beam opening 18. The beam area 6 is in the form of a strip and extends along a progression line 26. The beam opening 18 is arranged along the progression line 26, and at least one of the luminous areas, here the second luminous area 22, follows along the progression line 26 on both sides of the beam opening 18 on both sides. All light sources 24 are also on the progression line 26.

The lighting arrangement 2 is in the form of an integrated structural unit 32, that is to say the luminaires 12*a*, *b* and 21 and the projector 16 are fastened to one another. The unit 34 can be installed in the interior 4 as a complete device and is installed here in the mounting state M. The relative positions of the luminaires 12*a*, *b* and 21 and of the projector 16 with respect to one another are therefore determined by the mutual fastening to one another.

FIG. 3 shows an alternative lighting arrangement 2 in a view according to FIG. 1 with only a single alternative luminaire 12*a* and an alternative projector 16. FIG. 4 shows the arrangement from FIG. 3 in the direction of the arrow IV in a view like FIG. 2. On its first luminous area 14*a*, the first luminaire 12*a* has a passage region 34 in the form of an aperture or recess for the beam opening 18 of the projector 16. Alternatively, the passage region 34 is a translucent region. In this case too, the beam area 6 is again entirely formed from first luminous areas 14*a* and the beam opening 18, in which case "entirely" here also includes or allows a gap between the luminous area 14*a* and the beam opening 18.

The beam opening is set back behind the extensive passage region 34 in the beam-upstream direction, as seen in the direction of the emitted light 8. The beam opening 18 itself does not penetrate the passage region 34, but rather only the light 8 emitted by the beam opening 18.

In this case too, the first luminous area 14*a* is optically attractive by virtue of the mutual distance a between two adjacent light sources 24 in each case being equal. The light sources 24 have a different distance a', here 2.5 times the distance a (a'=2.5 a), only on both sides of the beam opening 18.

The beam opening 18 is again on the progression line 26 and the luminous area 14*a* follows on both sides. All light sources 24 are also on the progression line 26.

FIG. 5 shows another embodiment of a lighting arrangement 2 having two alternative first luminaires 12*a*, *b* and a projector 16 according to FIG. 3 in a view according to FIG. 1. In principle, this embodiment resembles that from FIGS. 3, 4 since a passage region 34 for the beam opening 18 is also provided here in the first luminaires 12*a*, *b*. However, two first luminaires 12*a*, *b* are adjacent here. The respective first luminous areas 14*a*, *b* have a respective section 42*a*, *b* of a passage region 34 on their edge sides 40*a*, *b* facing one another. The sections 42*a*, *b* complement one another to form the overall passage region 34. The passage region 34 is therefore formed from the two sections 42*a*, *b*.

FIG. 6 shows the lighting arrangement 2 from FIG. 5, again in a view according to FIG. 2. Only four light sources 24 which surround or encircle the passage region 34 are symbolically illustrated in the exemplary embodiment; the remaining light sources 24 have been omitted for the sake of clarity. Equal distances a between all adjacent light sources 24 can therefore be achieved again.

LIST OF REFERENCE SYMBOLS

2 Lighting arrangement
4 Interior
6 Beam area
8 Light
10 Environment
12*a*, *b* First luminaire
14*a*, *b* First luminous area
16 Projector
18 Beam opening
20 Surface region
21 Second luminaire
22 Second luminous area
24 Light source
26 Progression line
30 End side
32 Unit
34 Passage region
40*a*, *b* Edge sides
42*a*, *b* Sections
a,a' Distance
b Width
M Mounting state

What is claimed is:

1. A lighting arrangement for an interior of a vehicle, comprising:
   a beam area from which light is emitted into an environment of the lighting arrangement during operation of the lighting arrangement,
   at least one first luminaire having a first luminous area for emitting the light, the first luminous area being part of the beam area,
   wherein the lighting arrangement contains at least one projector with a beam opening for emitting the light, the beam opening being part of the beam area; at least one of the first luminaires has at least one passage region for at least one part of one of the beam openings of one of the projectors on its first luminous area; and/or in at least one of the projectors, a surface region of the projector which is adjacent to the beam opening is in the form of a second luminaire having a second luminous area for emitting light, the second luminous area being part of the beam area.

2. The lighting arrangement according to claim 1, wherein:
   the lighting arrangement has an at least semi-transparent cover in the region of the beam area, the cover being transparent to light from the beam opening in the passage region.

3. The lighting arrangement according to claim 2, wherein:

the cover is in the form of an optically effective and/or optically adjustable element at least in the passage region.

4. The lighting arrangement according to claim 1, wherein:
said first luminous areas and/or, if present, second luminous areas, correspond to one another with respect to their optical appearance.

5. The lighting arrangement according to claim 4, wherein:
said first luminous areas and/or, if present, said second luminous areas, correspond to one another with respect to the arrangement of light sources emitting the respective light.

6. The lighting arrangement according to claim 5, wherein:
the arrangement is the mutual distance (a) and/or the geometry of two light sources.

7. The lighting arrangement according to claim 6, wherein:
all distances (a) between adjacent light sources are equal with the exception of those distances (a') between light sources which are on both sides of a beam opening.

8. The lighting arrangement according to claim 1, wherein:
the beam area is formed entirely from said first luminous areas and, if present, said second luminous areas, and the beam openings.

9. The lighting arrangement according to claim 1, wherein:
the beam area is in the form of a strip and extends along a progression line.

10. The lighting arrangement according to claim 9, wherein
the beam openings are arranged along the progression line and at least one of the first luminous areas and, if present, second luminous areas, is respectively arranged on both sides of each of the beam openings.

11. The lighting arrangement according to claim 1, wherein
the lighting arrangement has at least two adjacent luminaires, the first luminous areas of which have, on their edge sides facing one another, respective sections which complement one another to form an overall passage region.

12. The lighting arrangement according to claim 1, wherein:
the surface region is an end side of the projector facing the environment in the intended mounting state (M).

13. The lighting arrangement according to claim 1, wherein
the luminaire is an LED luminaire.

14. The lighting arrangement according to claim 1, wherein:
the lighting arrangement is a lighting arrangement for a passenger cabin as an interior of an aircraft as a vehicle.

15. The lighting arrangement according to claim 1, wherein:
the lighting arrangement is in the form of an integrated structural unit which can be installed in the interior.

* * * * *